United States Patent [19]

Weber

[11] 4,012,702
[45] Mar. 15, 1977

[54] CHIME GENERATING CIRCUIT

[75] Inventor: Vernon F. Weber, Elmhurst, Ill.

[73] Assignee: GTE Automatic Electric Laboratories Incorporated, Northlake, Ill.

[22] Filed: Dec. 22, 1975

[21] Appl. No.: 642,968

[52] U.S. Cl. .................................. 331/76; 84/1.13; 179/84 T; 307/107; 328/32; 340/384 E
[51] Int. Cl.² ....................................... H03B 25/00
[58] Field of Search ........... 84/1.13, 1.26; 307/107; 328/16, 23, 32; 331/76; 179/84 T; 340/384 E

[56] References Cited
UNITED STATES PATENTS 3,146,314  8/1964  Boehly et al. ................... 179/84 T
3,911,295  10/1975  Barkow .............................. 328/32

Primary Examiner—John Kominski

[57]  ABSTRACT

A circuit for electronically generating chime-like tones wherein an oscillator circuit output is passed through a diode bridge having another diode across the D.C. terminals thereof and poled to be conductive. The resultant tone is distorted to considerably increase its harmonic content. Further to obtain the desired decoy characteristics a capacitor is included in series with said other diode to thus decrease the current through said bridge as the capacitor becomes charged.

5 Claims, 4 Drawing Figures

CHIME GENERATING CIRCUIT

BACKGROUND OF THE INVENTION

1. Field of the Invention

This invention relates to tone generators and more particularly to a generator which generates musical notes that sound like a chime.

2. Description of the Prior Art

In the past it has been conventional to generate these tones by actually striking chimes in close proximity to a transducer for application to a telephone paystation line to inform the party of the lapse of a predetermined time interval. Such chimes are used in Taiwan to warn the coversing parties that the connection will be terminated in another short interval of time.

Another method that has been used to synthesize a chime sound was by the use of a plurality of oscillators which are harmonically related. A particular level of each is selected and then all of the tones are mixed and fed to an amplifier. The essential characteristic of the sound of a chime is its rich harmonic tone content and its decaying level.

SUMMARY OF THE INVENTION

It is an object of this invention to provide an improved tone generator whose output resembles the sound of a chime.

It is another object of this invention to provide a tone generator whose output is constant for a short interval of time and then the amplitude gradually declines.

It is still another object of this invention to provide a tone generator having a tone whose harmonic content increases as the amplitude decreases.

These and other objects and features are achieved in the toene generator of the present disclosure wherein:

The paystation warning tone generator of this invention consists of three oscillators, tuned to the tones of G, B, and D of a major triad on the tone G, specifically taking G as 392 Hz, B as 494 Hz and D as 587 Hz. The output of each oscillator is fed to a corresponding buffer amplifier for isolation. The waveform at the output of each buffer amplifier is a sine wave. This sine wave is then fed into a circuit which distorts the sine wave to produce the necessary harmonics. This circuit utilizes the non-linear characteristics of a diode bridge with an additional diode across the bridge.

The three tones are then fed into a corresponding tone control circuit which selects one of these tones and controls its chime generator to gradually reduce its tone output before another tone is selected. These tones are then fed into an amplifier to increase the voltage and power to usable levels.

BRIEF DESCRIPTION OF THE DRAWING

The various features of the present invention may be better understood with reference to the accompanying drawings wherein.

DESCRIPTION OF THE PREFERRED EMBODIMENT

Figure 1:
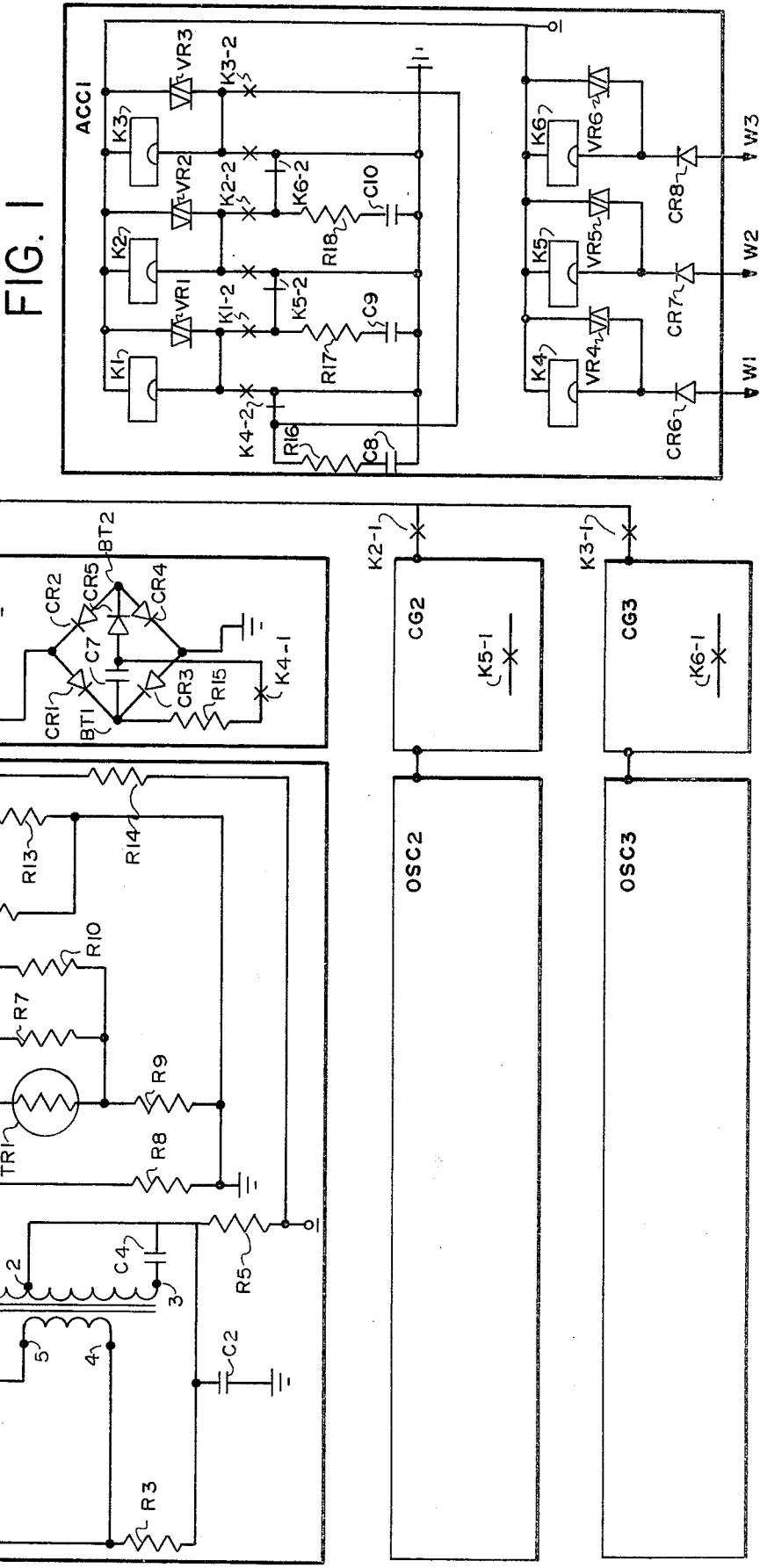
FIG. 1 shows a detailed schematic of one tone generator along with the control circuit for selecting the tones for application to the using equipment.

In FIG. 1 there is shown the paystation warning tone generator in accordance with the present invention. In block diagram form it consists of three oscillators and associated buffer amplifier labeled OSC1, OSC2 and OSC3. The oscillator and buffer amplifier of OSC1 is shown schematically while the other two are only shown as boxes. They are essentially the same as OSC1 except for the constants to produce the different frequencies. Each of the oscillator-buffer amplifier combinations OSC1, OSC2 and OSC3 are shown connected to a corresponding chime generator circuit labled CG1, CG2 and CG3. Again, only the details of the first box CG1 are shown in schematic detail. The outputs of these latter circuits are shown connected through corresponding make contacts labeled K1-1, K2-1 and K3-1 to an output amplifier A1, whose output is then used for application to the using equipment.

The individual chime generator circuits are controlled by a relay application control circuit ACC1.

Oscillator

This portion of box OSC1 consists of a tickler winding type of L-C temperature compensated oscillator. The active element of which is an NPN transistor Q1. Emitter current from Q1 is introduced into the oscillator transformer T1 through resistor R4 and the winding between terminals 1 and 2. The transformer T1 winding between terminals 2 and 3 along with capacitor C4 form the tank circuit which determines the frequency of oscillation. The winding between terminals 4 and 5 of transformer T1 applies a positive feedback to the base of transistor Q1 for sustaining the oscillation. Varistor VRO acts as an alternating current voltage regulator to keep the positive feedback constant regardless of the D.C. voltage supply or beta of transistor Q1. Resistors R1 and R3 are bias resistors for transistor Q1. Resistor R2 and capacitor C1 are used to suppress high frequency parasitic oscillations. Capacitor C2 and resistor R5 are used to decouple the oscillator from the amplifier so that low frequency oscillations cannot develop. Capacitor C3 is used to couple the output from the oscillator to a temperature compensation circuit consisting of resistors R6, R7, R8 and R9 and thermistor TR1. This will keep the output of the oscillator constant over an operating range of 0° C to 65° C.

Buffer Amplifier

The buffer amplifier also shown in box OSC1 is used to isolate the oscillator from the chime generator so that the latter receives a signal which is constant in both amplitude and frequency. Resistor R10 connected from the junction of resistors R7, R9 and the thermistor TR1 is used to increase the input impedance of transistor Q2 and thus further enchances the isolating characteristic of the buffer amplifier. Capacitor C5 connected between the resistor R10 and the base of transistor Q2 is used for D.C. blocking so that the transistor's bias resistors R11 and R12 are not affected. Resistor R13 is connected from the emitter of transistor Q2 to ground potential to produce some negative feedback to reduce the effects of the normal beta variations expected in commercial quality transistors, and also to increase the fidelity characteristic of this amplifier. Collector resistor R14 is connected to the negative D.C. source.

Chime Generator

The chime generator CG1 receives the output of the buffer amplifier from the collector of transistor Q2 via D.C. blocking capacitor C6 to terminal 4 of winding 3-4 of transformer T2. The other terminal 3 of transformer T2 is connected via a conventional diode bridge rectifier circuit consisting of diodes CR1, CR2, CR3 and CR4 to ground potential. A capacitor C7 and a diode poled to pass the D.C. current in series between terminals BT1 and BT2 of the bridge. The capacitor C7 is shunted by a resistor R15 and relay contacts K4-1 in series.

With contacts K4-1 closed, capacitor C7 is shorted out by resistor R15, thus causing a pulsating D.C. to pass through resistor R15.

Figure 2:
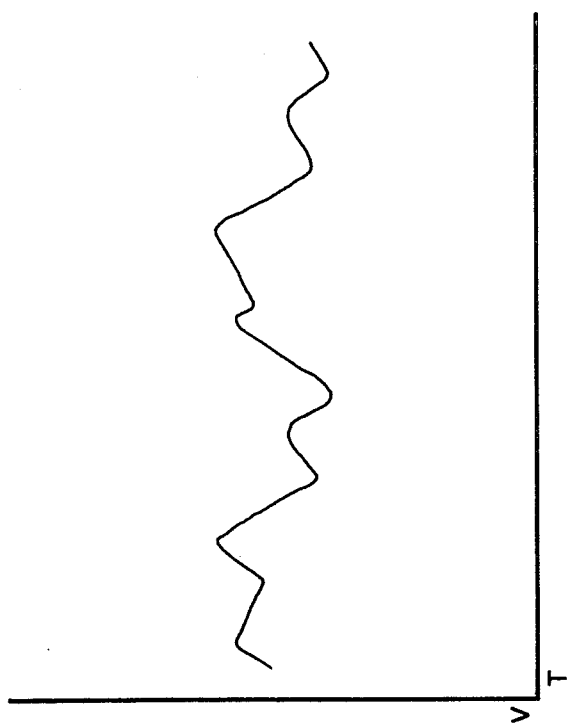
FIG. 2 shows a plot of the initial wave shape of the output.

A sine wave voltage is applied across the series circuit consisting of winding 3-4 of transformer T2, diode bridge circuit CR1-CR4, diode CR5, reisitor R15 and contacts K4-1 to ground. Because of the non-linear current vs. voltage characteristics of a diode in its conducting direction, the current through the primary winding 3-4 of transformer T2 while A.C. is not a pure sine wave, but is rich in harmonics. Thus the voltage waveform across the output winding 1-2 of transformer T2 is also rich in harmonics. This output waveform is illustrated in FIG. 2. When contacts K1-1 are closed, this tone is applied to the amplifier.

The output across winding 1-2 of transformer T2 is constant as long as contacts K4-1 are closed.

When contacts K4-1 are opened, capacitor C7 charges gradually by means of the diode rectifier circuit, CR1-CR4 and CR5. This, in turn, gradually reduces the A.C. current in the winding 3-4 of T2. This gradually decreasing current in the primary of T2 causes a gradually decreasing output across winding 1-2 of transformer T2. When capacitor C7 becomes fully charged, no more pulsating D.C. flows. Thus no more A.C. flows in the primary winding 3-4 of transformer T2, and the output across its secondary drops to zero. When contacts K1-1 are opened and contacts K4-1 are closed, capacitor C7 is discharged through resistor R15, and the circuit is reset.

Figure 3:
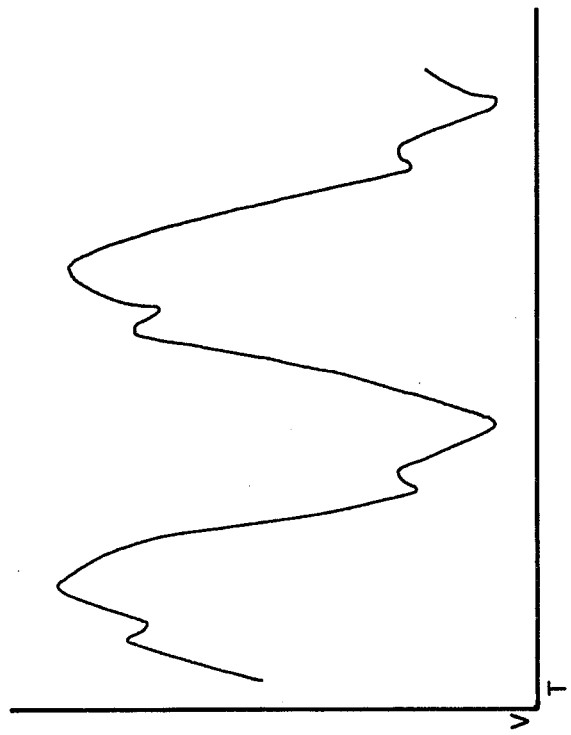
FIG. 3 shows a plot of the wave shape of the output after it begins to decline.

As stated above, the current through the diodes gradually decreases. This exaggerates the non-linear characteristic of the diodes, and produces relatively more harmonics. The waveform during a portion of this interval is shown in FIG. 3. Diode CR5 increases the non-linear effect, since at any one time, the current is flowing through three diodes. Depending on the polarity of the current they are diodes CR1, CR5, CR4 or CR3, CR5 and CR2. Resistor R15 also serves to protect contacts K4-1 from excessive surge current when capacitor C7 is discharged.

Application Control Circuit

This circuit consists of six relays K1-K6 controlled from an external source of pulses which apply a ground pulse in succession to each of the inputs labeled W1, W2 and W3. Grounding leads W1, W2, or W3 determines which of the three tones will be fed to the amplifier A1. This pulse sequence is graphically illustrated by the top three interrupted lines of FIG. 4 and are labeled W1, W2 and W3.

Figure 4:
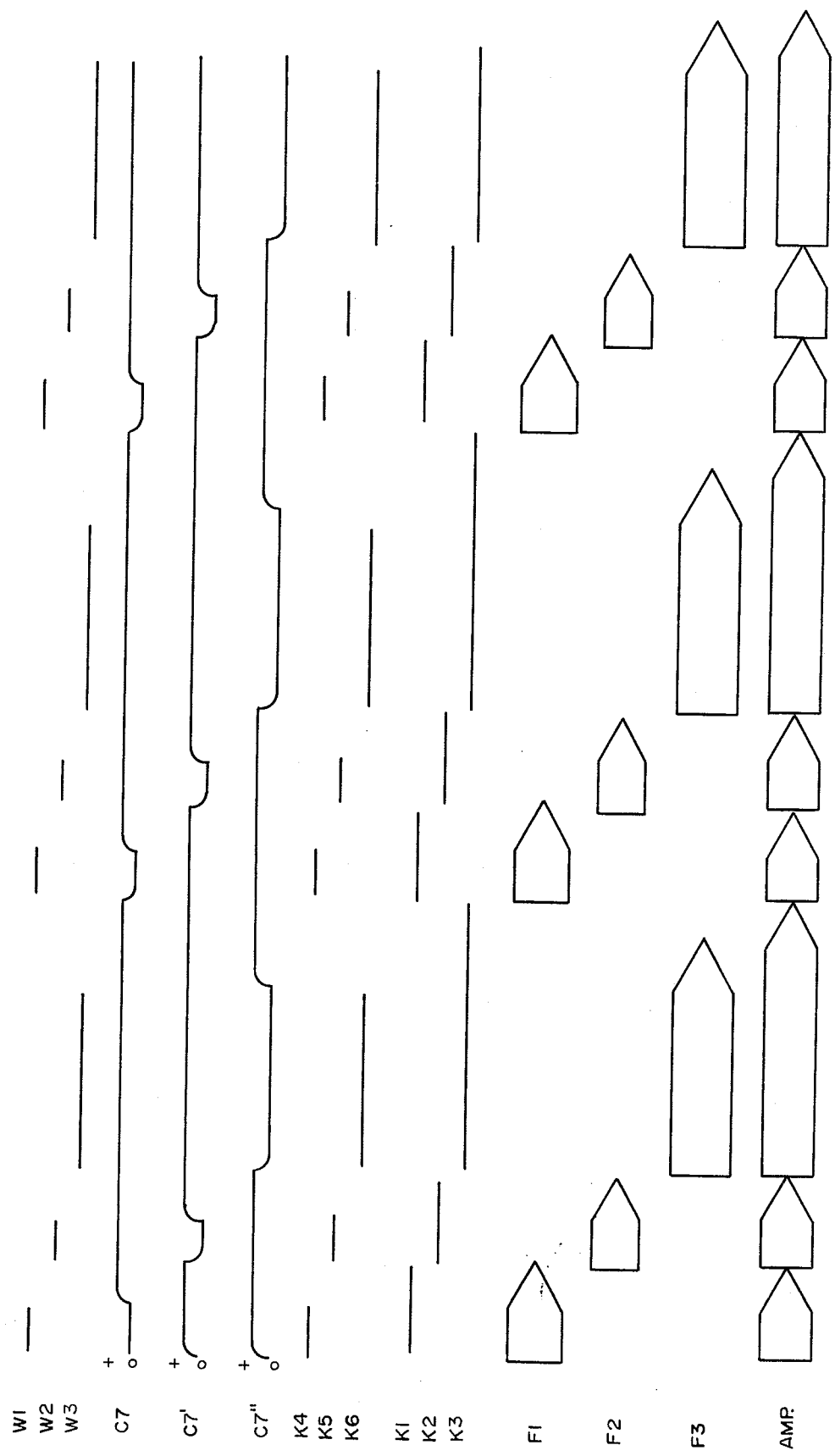
FIG. 4 shows a plot of the sequence of the application of the tones relative to the operation of the control relays.

The application of ground potential to lead W1 causes a current to flow via diode CR6 and the winding of relay K4 to negative battery. Relay K4 operates closing its contacts K4-1 to discharge capacitor C7 of the chime generator circuit CG1, and contacts K4-2 to complete a circuit from ground potential through the winding of relay K1 to negative battery potential. Relay K1 operates to close its contacts K1-1 to connect the output of the chime generator to the output amplifier A1 and contacts K1-2 for a holding path via the break contacts of K5-2. This sequence of the operation of the relays in response to the pulses is shown in FIG. 4.

Similarly, the combination of relays K5 and K2 are operated in response to a pulse on lead W2. Additionally, relay K5 upon operating will interrupt the holding path of relay K1 at the break contacts K5-2.

The operation of relays K6 and K3 follows a similar pattern but in response to the pulse on lead W3.

As a result of these relay operations the three notes are applied in succession and repeated once to a pay-station-originated call.

What is claimed is:

1. A harmonic rich tone generating means comprising: a frequency generating means having an output and operated to produce an alternating current at said output; and a harmonic generating means, including a transformer having a primary and an output winding, a rectifier bridge circuit connected in series with said primary winding between said output and a ground potential, said bridge circuit including another rectifier across the D.C. terminals of said bridge and poled in a conductive direction to complete a path to said ground potential, whereby said tone of said frequency generating means is distorted and available at said transformer output winding.

2. A harmonic rich tone generating means as claimed in claim 1 further including a control means, and a connect contact means operative to connect said output winding to other circuits, said control means operated to close said connect contact means to produce an output.

3. A harmonic rich tone generating means as claimed in claim 2 further including a capacitor in series with said other rectifier and a pair of shunt contacts across said capacitor, said shunt contacts operated to an open state by said control means to attenuate said output.

4. A chime generating means comprising: a plurality of frequency generating means each having an output and operated to produce an alternating current of a different frequency at said output, a plurality of harmonic generating means, each including a transformer having a primary and an output winding, a plurality of rectifier bridge circuits each connected in series with a respective one of said primary windings between said output and a ground potential, each said bridge circuit including another rectifier across the D.C. terminals of said bridge and poled in a conductive direction to complete a path to ground potential, an output amplifier, a control means and a connect contact means between a terminal of each said output winding and said output amplifier, said control means operated to selectively close said connect contact means to connect a particular frequency output to said output amplifier.

5. A chime generating means as claimed in claim 4 further including a capacitor in series with each said other rectifier and a pair of shunt contacts across said capacitor, said shunt contacts selectively operated to an open state by said control means to attenuate said output.

* * * * *